United States Patent
Park et al.

(10) Patent No.: US 9,891,713 B2
(45) Date of Patent: Feb. 13, 2018

(54) USER INPUT PROCESSING METHOD AND APPARATUS USING VISION SENSOR

(71) Applicant: SAMSUNG ELECTRONICS CO., LTD., Suwon-si (KR)

(72) Inventors: Keun Joo Park, Seoul (KR); Eric Hyun-surk Ryu, Hwaseong-si (KR); Jun Haeng Lee, Hwaseong-si (KR); Kyoobin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 14/577,386

(22) Filed: Dec. 19, 2014

(65) Prior Publication Data

US 2015/0234472 A1    Aug. 20, 2015

(30) Foreign Application Priority Data

Feb. 19, 2014 (KR) ........................ 10-2014-0018951

(51) Int. Cl.
  *G06F 3/01*    (2006.01)
  *G06F 1/16*    (2006.01)
  *G06F 3/03*    (2006.01)

(52) U.S. Cl.
  CPC ............ *G06F 3/017* (2013.01); *G06F 1/1686* (2013.01); *G06F 1/1694* (2013.01); *G06F 3/013* (2013.01); *G06F 3/0304* (2013.01)

(58) Field of Classification Search
  CPC ...... G06F 1/1686; G06F 1/1694; G06F 3/012; G06F 3/013; G06F 3/017
  USPC ................................................ 345/156–167
  See application file for complete search history.

(56) References Cited

U.S. PATENT DOCUMENTS

| | | | |
|---|---|---|---|
| 7,728,269 B2 * | 6/2010 | Lichtsteiner | H04N 3/155 250/208.1 |
| 8,478,346 B2 | 7/2013 | Yamazaki | |
| 9,380,245 B1 * | 6/2016 | Guidash | H04N 5/378 |
| 2010/0026838 A1 * | 2/2010 | Belenky | H04N 3/155 348/229.1 |
| 2013/0147701 A1 * | 6/2013 | Cripps | G06F 3/017 345/156 |
| 2013/0340006 A1 * | 12/2013 | Kwan | H04N 5/445 725/39 |
| 2015/0177830 A1 * | 6/2015 | Feng | G06F 3/017 345/156 |

FOREIGN PATENT DOCUMENTS

| | | |
|---|---|---|
| KR | 10-0749033 B1 | 8/2007 |
| KR | 10-2009-0034218 A | 4/2009 |
| KR | 10-2012-0034891 A | 4/2012 |
| KR | 10-2013-0092890 A | 8/2013 |
| KR | 10-2013-0096073 A | 8/2013 |
| WO | 2011/104837 A1 | 9/2011 |

* cited by examiner

*Primary Examiner* — Michael Pervan
(74) *Attorney, Agent, or Firm* — Sughrue Mion, PLLC

(57) ABSTRACT

A method and apparatus for processing a user input are provided. The method includes: determining a type of the user input based on a change amount of an input image; and processing the user input based on the determined type.

20 Claims, 15 Drawing Sheets

USER INPUT PROCESSING METHOD AND APPARATUS USING VISION SENSOR

CROSS-REFERENCE TO RELATED APPLICATION

This application claims priority from Korean Patent Application No. 10-2014-0018951, filed on Feb. 19, 2014 in the Korean Intellectual Property Office, the disclosure of which is incorporated herein by reference in its entirety.

BACKGROUND

1. Field

Methods and apparatuses consistent with exemplary embodiments relate to a user input processing method and apparatus using a vision sensor.

2. Description of the Related Art

In a touch interface-based user interfacing method, a user may input an intention of the user by directly touching an icon included in a display. Since the user directly touches the display of a device, the intention of the user may be improperly input to the device when a foreign substance is attached to a hand to be used for a touch input, or the user wears a glove on the hand.

In a spatial recognition-based user interfacing method, the intention of the user may be input by recognizing a gesture of the user. However, while holding a mobile device with one hand, the user may need to perform the input using another hand and thus, may experience an inconvenience.

SUMMARY

Exemplary embodiments may address at least the above problems and/or disadvantages and other disadvantages not described above. Also, one or more exemplary embodiments are not required to overcome the disadvantages described above, and an exemplary embodiment may not overcome any of the problems described above.

According to an aspect of an exemplary embodiment, there is provided a user input processing apparatus including: a receiver configured to obtain one or more events occurring in response to a change in an incident light; a determiner configured to determine a type of a user input based on a number of the one or more events; and a processor configured to process the user input based on the determined type.

The determiner may be configured to compute at least one velocity component, and determine the type of the user input based on the at least one velocity component.

The determiner may be configured to determine the user input to be one of at least three types, based on the number of the one or more events and a magnitude of at least one velocity component corresponding to the one or more events.

The at least three types may include a first type in which the number of the one or more events is less than a first threshold, a second type in which the number of the one or more events is greater than the first threshold and each magnitude of the at least one velocity component corresponding to the one or more events is less than a second threshold, and a third type in which the number of the one or more events is greater than the first threshold and the magnitude of the at least one velocity component is greater than the second threshold.

The processor may be configured to perform an operation corresponding to the type based on at least one of the type, a pattern of the user input, a current location of a pointer, and an application currently being executed.

According to an aspect of another exemplary embodiment, there is provided a user input processing method including: determining whether a change in an input image is caused by a movement of a vision sensor; and processing a user input based on a result of the determining.

The determining may include determining the change in the input image to be caused by the movement of the vision sensor if an amount of the change in the input image is greater than a first threshold.

The determining may include determining the change in the input image to be caused by a movement of an object being captured by the vision sensor if an amount of the change in the input image is less than a first threshold.

According to an aspect of another exemplary embodiment, there is provided a user input processing method including: determining at least one characteristic of a change in an input image captured by a vision sensor; determining a type of a user input according to the determined at least one characteristic; and processing a user input based on the determined type of the user input.

The determining the at least one characteristic may include determining a value of the change in the input image; and the determining the type of the user input may include determining the type of the user input to be a first type if the value of the determined change is less than a first threshold.

The determining the type of the user input may include determining the type of the user input to be a second type if the value of the determined change is less than the first threshold.

The determining the type of the user input may include: determining at least one velocity component corresponding to the change in the input image if the value of the determined change is greater than the first threshold; and determining the type of the user input based on the determined at least velocity component.

The determining the type of the user input based on the determined at least one velocity component may include: determining the type of the user input to be a second type if a magnitude of the determined at least one velocity component is less than a second threshold; and determining the type of the user input to be a third type if the magnitude of the determined at least one velocity component is greater than the second threshold.

The at least one velocity component may include a planar velocity component, an angular velocity component, and a Z-axial velocity component.

The change in the input image may be caused by a movement of an object captured by the vision sensor, or a movement of the vision sensor.

The determining the type of the user input may include: determining that the change in the input image is caused by the movement of the object if a value of the determined change is less than a first threshold; determining that the change in the input image is caused by the movement of the vision sensor if the value of the determined change is greater than the first threshold; determining the type of the user input to be a first type in response to determining that the change in the input image is caused by the movement of the object; and determining the type of the user input to be a second type in response to determining that the change in the input image is caused by the movement of the vision sensor.

According to an aspect of another exemplary embodiment, there is provided a non-transitory computer-readable recording medium which stores a program to implement the above-described method.

According to an aspect of another exemplary embodiment, there is provided a user input processing apparatus including: a determiner configured to determine at least one characteristic of a change in an input image captured by a vision sensor, and to determine a type of a user input according to the determined at least one characteristic; and a processor configured to process the user input based on the determined type.

The determiner may be configured to determine a value of the change in the input image, and determine the type of the user input to be a first type if the value of the determined change is less than a first threshold.

The determiner may be configured to determine the type of the user input to be a second type if the value of the determined change is less than the first threshold.

The determiner may be configured to determine at least one velocity component corresponding to the change in the input image if the value of the determined change is greater than the first threshold, and determine the type of the user input based on the determined at least velocity component.

The determiner may be configured to determine the type of the user input to be a second type if a magnitude of the determined at least one velocity component is less than a second threshold, and determine the type of the user input to be a third type if the magnitude of the determined at least one velocity component is greater than the second threshold.

The at least one velocity component may include a planar velocity component, an angular velocity component, and a Z-axial velocity component.

BRIEF DESCRIPTION OF THE DRAWINGS

The above and other aspects will become apparent and more readily appreciated from the following detailed description of certain exemplary embodiments, taken in conjunction with the accompanying drawings of which.

DETAILED DESCRIPTION OF EXEMPLARY EMBODIMENTS

Figure 1:
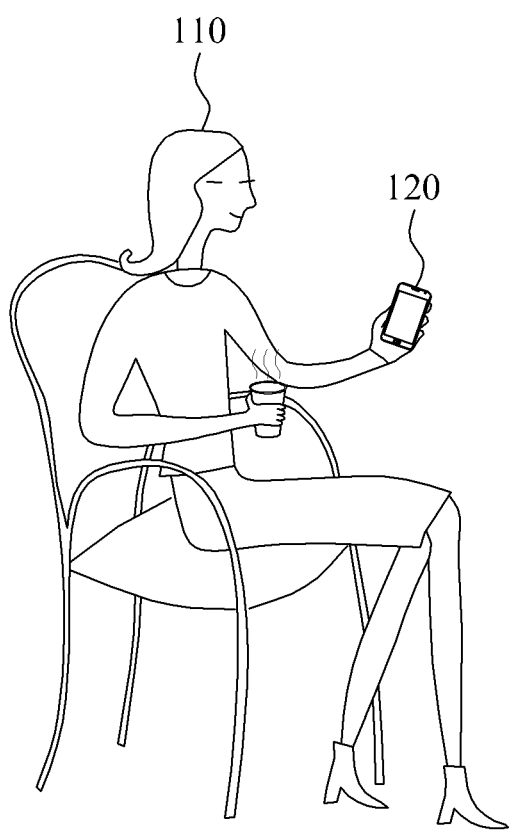
FIG. 1 is a diagram which illustrates a user input processing apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures. Hereinafter, it is understood that expressions such as "at least one of," when preceding a list of elements, modify the entire list of elements and do not modify the individual elements of the list.

FIG. 1 is a diagram which illustrates a user input processing apparatus 120 according to an exemplary embodiment. Referring to FIG. 1, the user input processing apparatus 120 according to an exemplary embodiment may be manipulated using a hand of a user 110. Here, the user input processing apparatus 120 may be an apparatus for processing an input of the user 110 and include various computing devices such as a smartphone, a personal digital assistant (PDA), a tablet personal computer (PC), a portable device, a mobile device, a portable multimedia player, a smart device, a PC, a laptop PC, a netbook, an ultrabook, a convertible ultrabook, a digital camera, etc.

As an example, the user 110 may hold the user input processing apparatus 120 using one hand, and input an intention of the user 110 without using another hand. The user 110 may input the intention of the user 110 by performing a simple gesture, for example, an eye blinking or a tongue-thrusting, while holding the user input processing apparatus 120. By moving the user input processing apparatus 120, the user 110 may also input the intention of the user 110. The user 110 may input the intention in various patterns such as moving the user input processing apparatus 120 slowly or quickly, by way of example.

Hereinafter, descriptions of exemplary embodiments in which the user input processing apparatus 120 is supported using a hand of the user 110, and the user 110 inputs an intention of the user 110 using only the hand holding the user input processing apparatus 120 will be provided for increased clarity and conciseness. One or more exemplary embodiments may be directly applied to a case in which the user input processing apparatus 120 is supported using both hands. In contrast to a related art interface based on a touch input or spatial recognition, which is implemented by using a hand to support a device and another hand to perform an input, the user input processing apparatus 120 may be used to input an intention of the user 110 by using only one of both hands to support the user input processing apparatus 120.

Figure 2:
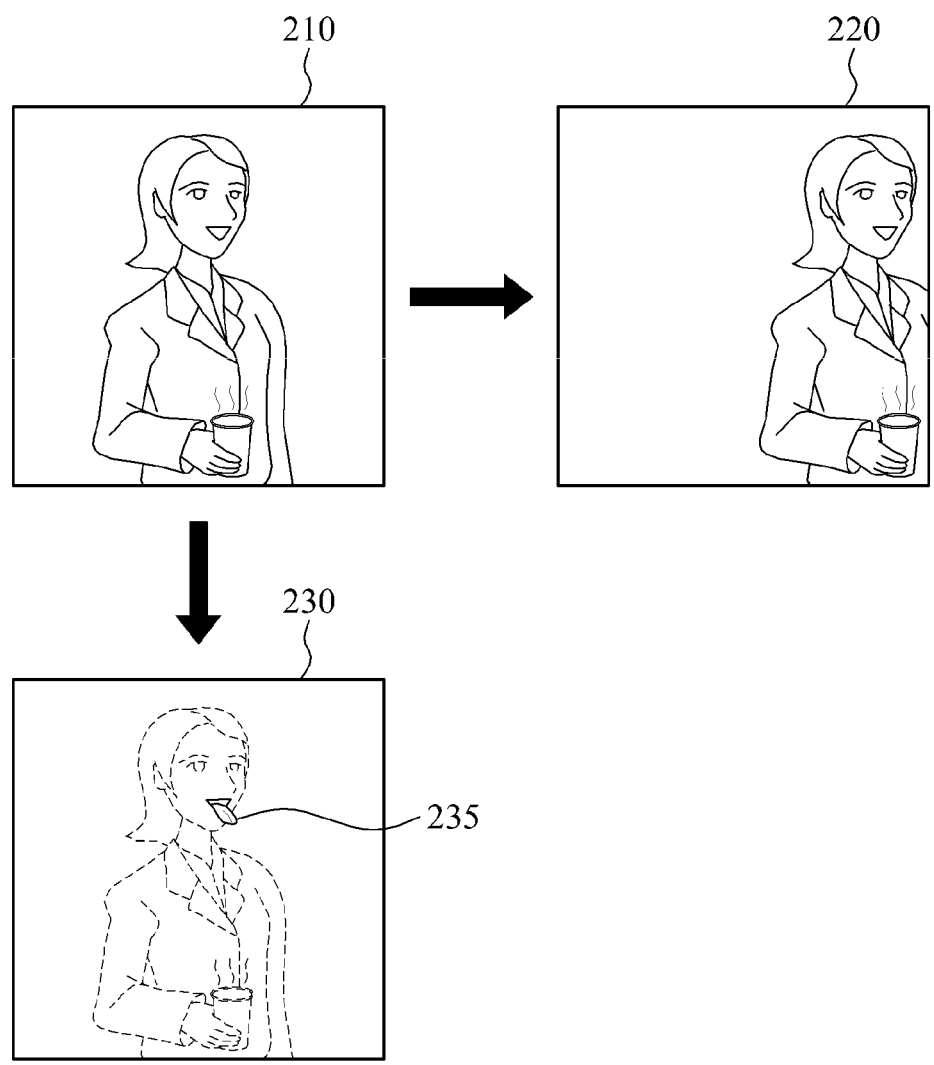
FIG. 2 is a diagram which illustrates an input image changed by a first type input, a second type input, and a third type input according to an exemplary embodiment.

FIG. 2 is a diagram which illustrates an input image changed by a first type input, a second type input, and a third type input according to an exemplary embodiment. A user input processing apparatus according to an exemplary embodiment may process a user input based on an output of a sensor, e.g., a vision sensor such as a camera or an image sensor. Here, the vision sensor may include at least one of a frame-based image sensor for capturing an image on a frame-by-frame basis, a depth sensor for measuring a depth between a sensor and an object, and an event-based sensor for outputting an event in response to a change in a light incident into a sensor. Hereinafter, the output of the vision sensor may also be referred to as an input image of the user input processing apparatus.

The user input processing apparatus may process a user input based on a change in the input image (i.e., a change in the output of the vision sensor). For example, the user input processing apparatus may determine a type of the user input based on the change in the input image, and process the user input based on the determined type.

The user input processing apparatus may determine the user input to be one of a predetermined plurality of types based, for example, on a velocity corresponding to the change in the input image and a change amount of the input image. For example, when the change amount is less than a predetermined first threshold, the user input processing apparatus may determine a user input to be a first type. When the change amount is greater than the predetermined first threshold and the velocity corresponding to the change in the input image is less than a predetermined second threshold, the user input processing apparatus may determine the user input to be a second type. When the change amount of the input image is greater than the predetermined first threshold and the velocity corresponding to the change in the input image is greater than the predetermined second threshold, the user input processing apparatus may determine the user input to be a third type. However, it is understood that one or more other exemplary embodiments are not limited to the above. For example, according to another exemplary embodiment, the user input processing apparatus may determine a user input to be the first type when the change amount is greater than the predetermined first threshold, and may determine the user input to be the second type or the third type when the change amount is less than the predetermined first threshold.

Furthermore, the user input processing apparatus may determine a user input for an operation performed on a boundary depending on a setting (e.g., a default setting or a predetermined setting). For example, when a change amount of the input image is equal to the first threshold, the user input processing apparatus may determine a user input to be the first type depending on a setting. Alternatively, when the change amount of the input image is equal to the first threshold, depending on a setting, the user input processing apparatus may compute a velocity corresponding to the change in the input image, and determine the user input to be the second type or the third type based on the computed velocity.

Referring to FIG. 2, the user input processing apparatus may distinguish a case of a large change amount of an input image and a case of a small change amount of an input image. The user input processing apparatus may distinguish a case of receiving a first input image 220 having a large change amount as compared to a reference image 210, and a case of receiving a second input image 230 having a small change amount as compared to the reference image 210.

In an example, as shown in the first input image 220, a user may move the user input processing apparatus. In this example, a vision sensor included in the user input processing apparatus may be correspondingly moved, and an overall image captured by the vision sensor or a light incident on to the vision sensor may be changed. The user input processing apparatus may determine a change amount to be large (e.g., may determine the change amount to be greater than a first threshold value), based on the first input image 220.

When the user input processing apparatus determines the input image has a large change amount, a velocity corresponding to the change in the input image may be computed (e.g., calculated, obtained, or determined). When the computed velocity is relatively low (e.g., less than a second threshold value), the user input processing apparatus may determine the user input to be the second type. For example, when the user slowly moves the user input processing apparatus, an overall input image may be changed and thus, a change amount of the input image may be relatively large whereas a velocity corresponding to the change in the input image may be relatively low. In this example, the user input processing apparatus may determine the user input to be the second type.

When the computed velocity is relatively high (e.g., greater than the second threshold value), the user input processing apparatus may determine the user input to be the third type. For example, when the user quickly moves the user input processing apparatus, the overall image may be quickly changed and thus, the change amount of the input image may be relatively large and the velocity corresponding to the change of the input image may be relatively large. In this example, the user input processing apparatus may determine the user input to be the third input.

In another example, as shown in the second input image 230, the user may perform a gesture of a tongue-thrusting, in lieu of (or in addition to) moving the user input processing apparatus. In this example, a light corresponding to a portion changed due to the gesture may be changed among the light incident into the vision sensor. The user input processing apparatus may determine a change amount to be small (e.g., less than a threshold value), based on the second input image 230. When the user input processing apparatus determines that the change amount is small, the user input may be determined to be the first type.

The user input processing apparatus may determine a change in an input image in various patterns. For example, when an input image is an output of a frame-based image sensor, the user input processing apparatus may determine a change in the input image by comparing input images of different frames. Based on a result of the comparing, the user input processing apparatus may determine whether a change amount of the input image is small or large (e.g., less than or greater than a threshold value).

When the input image is an output of an event-based sensor, the user input processing image may determine the change amount of the input image based on the number of events. By way of example, the event-based sensor may sense a change in a brightness of an incident light from a plurality of pixels, and asynchronously output an event from each pixel in which the change in brightness of the incident light is sensed. The event may include an instructor of the pixel in which the change in brightness of the incident light is sensed, and a timestamp at which the change in brightness of the incident light is sensed.

The user input processing apparatus may determine the change amount of the input image based on a plurality of events included in the input image. The user input processing apparatus may compare a number of events and a predetermined first threshold, for example, "100". When the number of events is less than the predetermined first threshold, the user input processing apparatus may determine the change amount of the input image to be small. When the number of events is greater than the predetermined first threshold, the user input processing apparatus may determine the change amount of the input image to be large.

The user input processing apparatus may determine the change amount of the input image based on a distribution of events included in the input image. For example, when the distribution is less than a predetermined threshold distribution, the user input processing apparatus may determine the change amount of the input image to be small. When the distribution of the events is greater than the predetermined threshold distribution, the user input processing apparatus may determine the change amount of the input image to be large.

The user input processing apparatus may compute a velocity corresponding to the change in the input image, based on a plurality of events included in the input image. In this example, the velocity may include at least one velocity component. For example, the at least one velocity component may include a planar velocity component, an angular velocity component, and a Z-axial velocity component. The planar velocity component may be a velocity component having an X-axial direction and a Y-axial direction on a virtual plane parallel to the vision sensor. The angular velocity component may be a velocity component having a rotation direction on the virtual plane. The Z-axial velocity component may be a velocity component having a direction moving away from or approaching the vision sensor. The at least one velocity component may include a six degrees of freedom (6 DoF) directional velocity component.

The user input processing apparatus may detect events corresponding to an object, for example, a face of a user from among the plurality of events included in the input image. The user input processing apparatus may compute at least one velocity component corresponding to the events corresponding to the object.

The user input processing apparatus may compute the at least one velocity component based on a timestamp and an index of a pixel included in an event. For example, the user input processing apparatus may manage a table storing a timestamp at which the most recent event occurs in each of the plurality of pixels. When a new event is received, the user input processing apparatus may update a value of a table element corresponding to an index of a pixel included the new event, based on a timestamp included in the new event.

The user input processing apparatus may compute a velocity vector of each of the plurality of pixels based on the table. The user input processing apparatus may compute the velocity vector of a pixel based on a difference in timestamps and a difference in distances between the pixel and a neighboring pixel. When the velocity vectors of the plurality of pixels are computed, the user input processing apparatus may compute at least one velocity component based on the plurality of velocity vectors.

As an example, the user input processing apparatus may compute the at least one velocity component using a rigid body model. In this example, the user input processing apparatus may analyze a four degrees of freedom (4DoF) motion of an object included in the input image.

For example, the object may move using a two-dimensional (2D) planar velocity component $V_p$. The object may rotate based on an angular velocity component w relative to a rotation center $O_c$. The object may be enlarged or reduced based on a Z-axial velocity component $V_z$ relative to a scaling center $O_z$.

The user input processing apparatus may analyze the planar velocity component, the angular velocity component, and the Z-axial velocity component of the object. The user input processing apparatus may compute a velocity $V_i$ of a predetermined point $P_i$. The user input processing apparatus may model the velocity $V_i$ as shown in Equation 1.

$$V_{zi}+V_{ri}+V_p=V_i \quad \text{[Equation 1]}$$

In Equation 1, $V_{zi}$ denotes a Z-axial velocity component, $V_{ri}$ denotes an angular velocity component, and $V_p$ denotes a planar velocity component on the point $P_i$. By modeling the velocity $V_i$ as shown in Equation 1, the user input processing apparatus may divide the velocity $V_i$ on the point $P_i$ into the Z-axial velocity component, the angular velocity component, and the planar velocity component. In this example, Equation 1 may be expressed as shown in Equation 2.

$$tP_i+\omega A(P_i-O_c)+V_p=V_i \quad \text{[Equation 2]}$$

In Equation 2, $tP_i$ denotes a Z-axial velocity component. In $tP_i$, a coordinate $P_i$ of which an origin is the scaling center $O_z$ may indicate a magnitude and a direction of the vector $V_{zi}$, and a parameter t may scale a magnitude of the vector $V_{zi}$. $\omega A(P_i-O_c)$ denotes an angular velocity component. In $\omega A(P_i-O_c)$, a coordinate difference $(P_i-O_c)$ may indicate a magnitude and a direction of a vector oriented from the rotation center $O_c$ toward the coordinate $P_i$, and a matrix A may be a rotation matrix rotating the vector oriented from the rotation center $O_c$ toward the coordinate $P_i$. For example, the matrix A may be expressed by $$A = \begin{pmatrix} 0 & -1 \\ 1 & 0 \end{pmatrix}.$$

The vector rotated by the matrix A may instruct a vector $V_{ri}$, and a parameter $\omega$ may scale a magnitude of the vector $V_{ri}$.

Since the user input processing apparatus is aware of coordinates, for example, the coordinate $P_i$ of the plurality of points and velocities, for example, the velocity $V_i$ of corresponding points, the Z-axial velocity component parameter t, the angular velocity parameter $\omega$, the rotation center $O_c$, and the planar velocity component $V_p$ may be computed based on Equation 2. As described above, the user input processing apparatus may analyze at least one of the planar velocity component, the angular velocity component, and the Z-axial velocity component, which are based on 4DoF, with respect to the object.

As another example, the user input processing apparatus may include a planar velocity component computing unit (e.g., planar velocity component computer), an optical flow center computing unit (e.g., optical flow center computer), a Z-axial velocity component computing unit (e.g., Z-axial velocity component computer), and an angular velocity component computing unit (e.g., angular velocity component computer). In this example, an optical flow may include a velocity vector of at least one pixel in which an event occurs.

The planar velocity component computing unit may compute an X-axis directional velocity component and a Y-axis directional velocity component based on the optical flow. For example, the planar velocity component computing unit may compute an average of the optical flow so as to compute the X-axis directional velocity component and the Y-axis directional velocity component. The planar velocity component computing unit may compute the average of the optical flow by computing a vector sum of a velocity vector of at least one pixel.

In this example, since the velocity vector of the at least one pixel is a 2D vector, the average of the optical flow may also be a 2D vector. The planar velocity component computing unit may compute the X-axis directional velocity component and the Y-axis directional velocity component by separating an X-axial component and a Y-axial component from the computed average of the optical flow.

The optical flow center computing unit may compute a center of the optical flow based on the optical flow. For example, the optical flow center computing unit may compute a center c of an optical flow using Equation 3.

$$c = \left( \frac{\sum_i |V_{xi}|x_i}{\sum_i |V_{xi}|}, \frac{\sum_i |V_{yi}|y_i}{\sum_i |V_{yi}|} \right) \quad \text{[Equation 3]}$$

In Equation 3, $(x_i, y_i)$ indicates a position of at least one pixel on which an event occurs, $V_{xi}$ denotes an X-axis directional velocity component of a corresponding pixel, and $V_{yi}$ denotes a Y-axis directional velocity component of the corresponding pixel.

The Z-axial velocity component computing unit may compute the Z-axis directional velocity component based on the optical flow and the center of the optical flow. For example, the Z-axial velocity component computing unit may compute a Z-axis directional velocity component $V_z$ based on Equation 4.

$$V_z = \sum_i \vec{P}_i \cdot \vec{V}_i \quad \text{[Equation 4]}$$

In Equation 4, $\vec{P}_i$ denotes a vector oriented from the center of the optical flow toward an $i^{th}$ pixel, and $\vec{V}_i$ denotes a velocity vector of the $i^{th}$ pixel.

The angular velocity component computing unit may compute the angular velocity component based on the optical flow and the center of the optical flow. For example, the angular velocity component computing unit may compute an angular velocity component w based on Equation 5.

$$\omega = \sum_i \vec{P}_i \times \vec{V}_i \quad \text{[Equation 5]}$$

In Equation 5, $\vec{P}_i$ denotes a vector oriented from the center of the optical flow toward an $i^{th}$ pixel, and $\vec{V}_i$ denotes a velocity vector of the $i^{th}$ pixel.

As described above, when the change amount of the input image is greater than the predetermined first threshold, the user input processing apparatus may compute the planar velocity component, the angular velocity component, and the Z-axial velocity component. When all of the planar velocity component, the angular velocity component, and the Z-axial velocity component are less than the predetermined second threshold, the user input processing apparatus may determine the user input to be the second type. When at least one of the planar velocity component, the angular velocity component, and the Z-axial velocity component is greater than the predetermined second threshold, the user input processing apparatus may determine the user input to be the third type.

However, it is understood that the above is just an exemplary embodiment, and one or more other exemplary embodiments are not limited thereto. For example, according to another exemplary embodiment, only one or two components among the planar velocity component, the angular velocity component, and the Z-axial velocity component may be considered when the change amount of the input image is greater than the predetermined first threshold. Furthermore, according to another exemplary embodiment, when at least one of the planar velocity component, the angular velocity component, and the Z-axial velocity component is less than the predetermined second threshold, the user input processing apparatus may determine the user input to be the second type, and when all of the planar velocity component, the angular velocity component, and the Z-axial velocity component are greater than the predetermined second threshold, the user input processing apparatus may determine the user input to be the third type.

The user input processing apparatus may process the user input differently based on a type of the user input. Hereinafter, descriptions of examples of processing the user input will be provided with reference to FIGS. 3, 4, 5A through 5E, and 6 through 8.

Figure 3:
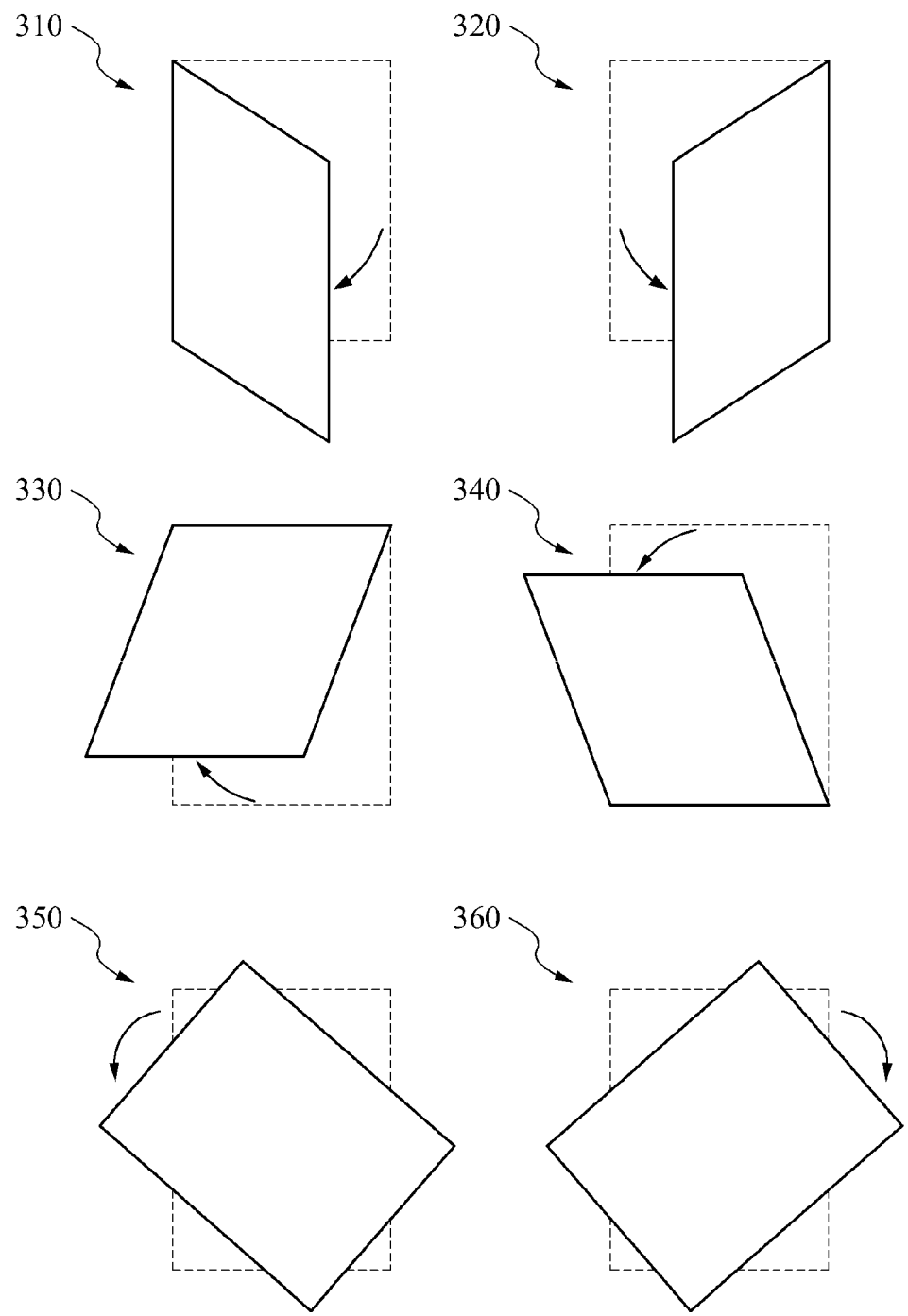
FIG. 3 is a diagram which illustrates an example of a second type input according to an exemplary embodiment.

FIG. 3 is a diagram which illustrates an example of a second type input according to an exemplary embodiment. When a user input is determined to be the second type input, a user input processing apparatus according to an exemplary embodiment may process the user input based on a second type. As described above, the second type input and a third type input may be distinguished based on a velocity corresponding to a change in an input image. Hereinafter, in the example illustrated in FIG. 3, it is assumed that the velocity corresponding to the change in the input image corresponds to the second type input for increased clarity and conciseness.

Referring to FIG. 3, in response to a user input 310, the user input processing apparatus may determine that a change amount of an input image is greater than a predetermined first threshold, and a velocity corresponding to a change in an input image is less than a predetermined second threshold. Accordingly, the user input processing apparatus may determine the user input 310 corresponds to the second type, and perform an operation corresponding to the second type.

For example, the user input processing apparatus may perform an operation of moving a pointer based on Equation 6.

$$x_t = x_{t-2} + V_x \Delta T_e / C_s$$

$$y_t = y_{t-1} + V_y \Delta T_e / C_s \quad \text{[Equation 6]}$$

In Equation 6, $(x_t, y_t)$ denotes coordinates of a location to which the pointer is to be moved, and $(x_{t-1}, y_{t-1})$ denotes coordinates of a current location of the pointer. $V_x$ denotes an X-axis directional velocity component corresponding to the change in the input image, and $V_y$ denotes a Y-axis directional velocity component corresponding to the change in the input image. $\Delta T_e$ denotes a temporal difference, for example, a difference in an average time, between a previous event and a current event, and $C_s$ denotes a sensitivity constant. The greater the sensitivity constant, the greater the degree of displacement of the pointer with respect to an identical change amount.

The user input processing apparatus may perform the operation corresponding to the second type based on a pattern of the user input 310 and an application currently being executed. In this example, the pattern of the user input 310 may include a movement form and a magnitude or direction of a velocity corresponding to the user input 310. For example, when a pointer is included in the application currently being executed, the user input processing apparatus may perform an operation of moving the pointer in a leftward direction corresponding to the user input 310. The user input processing apparatus may control a moving velocity of the pointer based on the magnitude of the velocity corresponding to the user input 310. However, it is understood that one or more other exemplary embodiments are not limited thereto. For example, according to another exemplary embodiment, the user input processing apparatus may perform an operation of moving an activated icon in the leftward direction or an operation of scrolling in the leftward direction on a web browser (or a currently executed application window), based on the application currently being executed.

In response to a user input 320, the user input processing apparatus may perform an operation of moving the pointer in a rightward direction, an operation of scrolling in the rightward direction on the web browser (or a currently executed application window), or an operation of moving the activated icon in the rightward direction, based on the application currently being executed.

In response to a user input 330, the user input processing apparatus may perform an operation of moving the pointer in an upward direction, an operation of scrolling up on the web browser, or an operation of moving the activated icon in the upward direction, based on the application currently being executed.

In response to a user input 340, the user input processing apparatus may perform an operation of moving the pointer in a downward direction, an operation of scrolling down on the web browser, or an operation of moving the activated icon in the downward direction, based on the application currently being executed.

In response to a user input 350, the user input processing apparatus may perform an operation of moving the pointer in the leftward direction, an operation of loading or displaying a previously viewed page on the web browser, or an operation of moving the activated icon in the leftward direction, based on the application currently being executed.

In response to a user input 360, the user input processing apparatus may perform an operation of moving the pointer in the rightward direction, an operation of loading or displaying a subsequently viewed page on the web browser, or moving the activated icon in the rightward direction, based on the application currently being executed.

The operations described herein are provided as examples, and it is understood that one or more other exemplary embodiments are not limited thereto. Thus, operations corresponding to a type of a user input may be provided in various forms.

Figure 4:
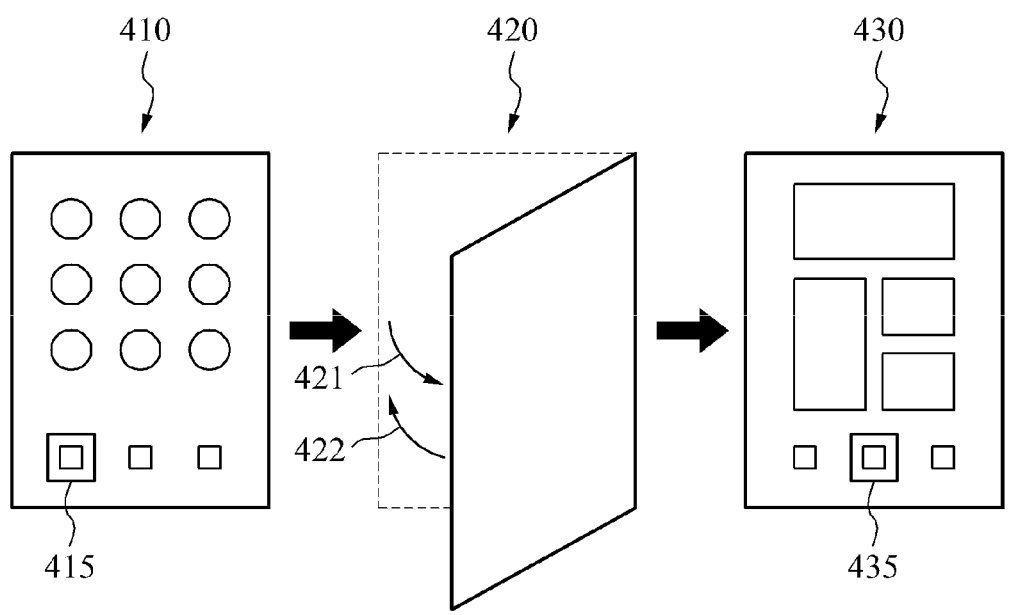
FIG. 4 is a diagram which illustrates an example of a third type input according to an exemplary embodiment.

FIG. 4 is a diagram which illustrates an example of a third type input according to an exemplary embodiment. When a user input is determined to be the third type input, a user input processing apparatus according to an exemplary embodiment may process the user input based on a third type. As described above, a second type input and the third type input may be distinguished based on a velocity corresponding to a change in an input image. Hereinafter, in the example illustrated in FIG. 4, it is assumed that the velocity corresponding to the change in the input image corresponds to the third type input for increased clarity and conciseness.

Referring to FIG. 4, in response to a user input 420, the user input processing apparatus may determine that a change amount of an input image is greater than a predetermined first threshold, and a velocity corresponding to a change in the input image is greater than a predetermined second threshold. Accordingly, the user input processing apparatus may determine the user input 420 corresponds to the third type, and perform an operation corresponding to the third type. For example, the user input processing apparatus may perform an operation of flipping a page.

The user input processing apparatus may perform the operation corresponding to the third type based on a pattern of the user input 420 and an application currently being executed. Similar to descriptions of FIG. 3, the pattern of the user input 420 may include a movement form and a magnitude or a direction of a velocity corresponding to the user input 420. For example, when the application currently being executed includes a plurality of pages, the user input processing apparatus may perform an operation of flipping a page in a rightward direction corresponding to the user input 420.

The user input processing apparatus may display a screen 430 corresponding to a second page 435 in response to the user input 420 received while displaying a screen 410 corresponding to a first page 415.

When a user input is determined to be the third type input, the user input processing apparatus may not process a new user input during a predetermined time interval after the user input determined to be the third type input. For example, the user input processing apparatus may determine a first input 421 quickly rotating in the rightward direction to be the third type input, and perform the operation of flipping a page in the rightward direction. In this example, the user input processing apparatus may not process a second input 422 returning to an original position.

The user input processing apparatus may differently process the third type input based on the application currently being executed. For example, when a multimedia replay application is being executed, the user input processing apparatus may perform an exit function in response to the third type input.

Figure 5A:
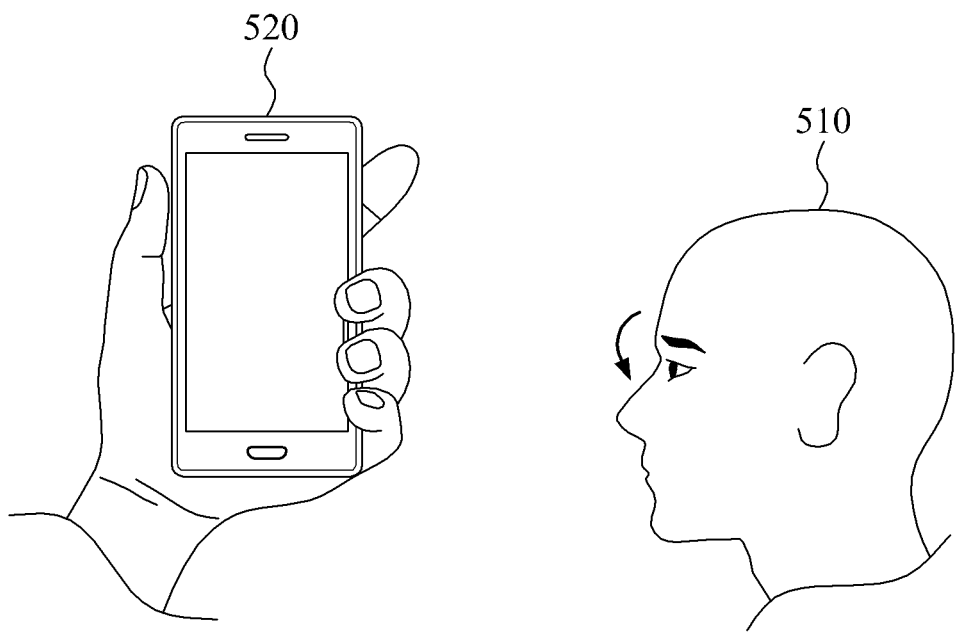
FIG. 5A is a diagram which illustrates an example of a first type input according to an exemplary embodiment.

FIG. 5A is a diagram which illustrates an example of a first type input according to an exemplary embodiment. Referring to FIG. 5A, a user input processing apparatus 520 according to an exemplary embodiment may determine an input of which an input image has a relatively small change amount, to be the first type input.

For example, the user input processing apparatus 520 may determine a facial gesture such as an eye blinking, a pupil movement, a nose tip movement, a tongue movement, a lip movement, a head movement, etc., of a user 510, to be the first type input. However, it is understood that one or more other exemplary embodiments are not limited thereto. For example, according to another exemplary embodiment, the user input processing apparatus 520 may determine an input, for example, a shoulder movement of the user 510 of which an input image change amount corresponds to a relatively small range (e.g., less than a threshold value), to be the first type input.

When a user input is determined to be the first type input, the user input processing apparatus 520 may perform the operation corresponding to the first type input. For example, the user input processing apparatus 520 may perform a selecting operation.

The user input processing apparatus 520 may perform the operation corresponding to the first type, based on a current location of a pointer. For example, when the pointer is currently located on a selectable object, the user input processing apparatus 520 may perform an operation of selecting a corresponding object in response to the first type input. When the pointer is not located on the selectable object, the user input processing apparatus 520 may perform an operation of initializing a location of the pointer to be a center of a screen in response to the first type input.

Furthermore, the user input processing apparatus 520 may perform the operation corresponding to the first type based on the pattern of the user input. For example, the user input processing apparatus 520 may determine whether a change in an input image corresponding to an eye blinking gesture is repeated a predetermined number of times. When a result of the determining indicates the change in the input image corresponding to the eye blinking gesture is repeated the predetermined number of times, the user input processing apparatus 520 may perform the operation corresponding to the first type.

Also, when a change in an input image corresponding to a few events (e.g., less than a predetermined number of events) is consecutively received during a predetermined time interval, the user input processing apparatus 520 may perform the operation corresponding to the first type.

Moreover, the user input processing apparatus 520 may perform the operation corresponding to the first type based on the application currently being executed. For example, when a multimedia replay application is being executed, the user input processing apparatus 520 may perform a predetermined operation, e.g., a replay operation or a pause operation in response to the first type input.

Further, in response to a pupil movement of the user 510, the user input processing apparatus 520 may perform an operation of adjusting a location of the pointer to be a location corresponding to the pupil movement, or initializing the location of the pointer to be a center of a screen.

Figure 5B:
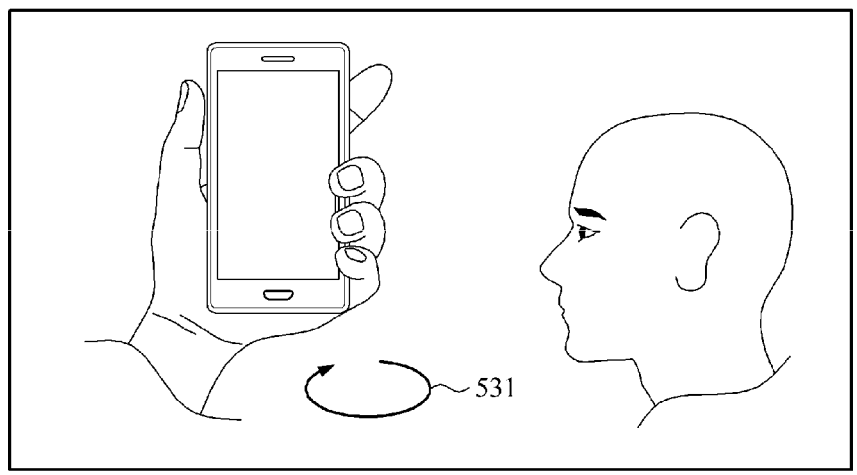
FIGS. 5B through 5E are diagrams which illustrate examples of processing a user input according to one or more exemplary embodiments.
Figure 5B:
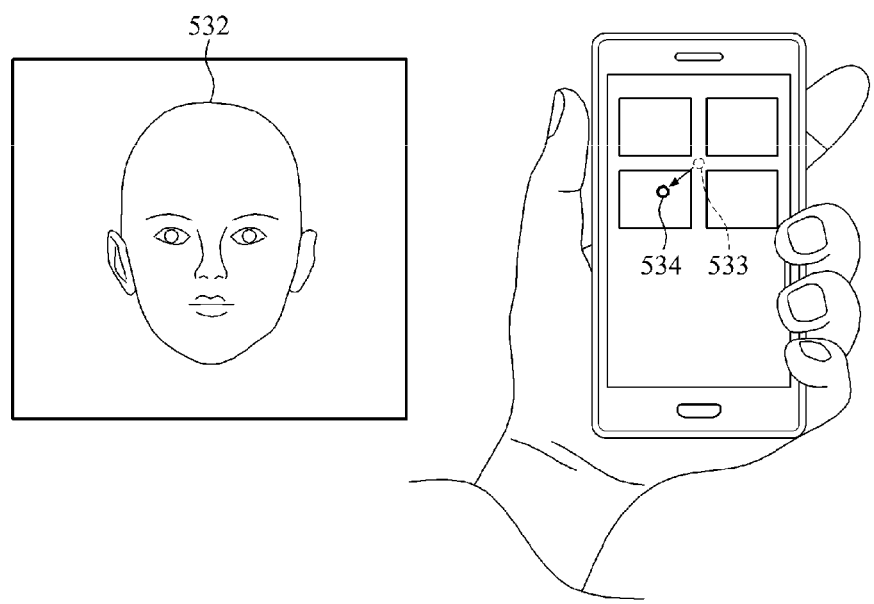

FIGS. 5B through 5E are diagrams which illustrate examples of processing a user input according to one or more exemplary embodiments. According to an exemplary embodiment, a user input processing apparatus may move a cursor, and process inputs of selecting an object of a location of the cursor. Referring to FIG. 5B, an input 531 of moving the user input processing apparatus may be processed. For example, a user may move the user input processing apparatus including a vision sensor in a state of gazing at the vision sensor. When the vision sensor is an event-based sensor, the vision sensor may output events corresponding to a facial outline of the user. Based on a number or a distribution of the events 532, the user input processing apparatus may determine that a change amount of the input image is large (e.g., greater than a threshold value). In this case, the user input processing apparatus may compute at least one velocity component corresponding to a change in the input image. When the computed velocity component indicates a lower left direction, the user input processing apparatus may move the cursor from a first location 533 to a second location 534.

Figure 5C:
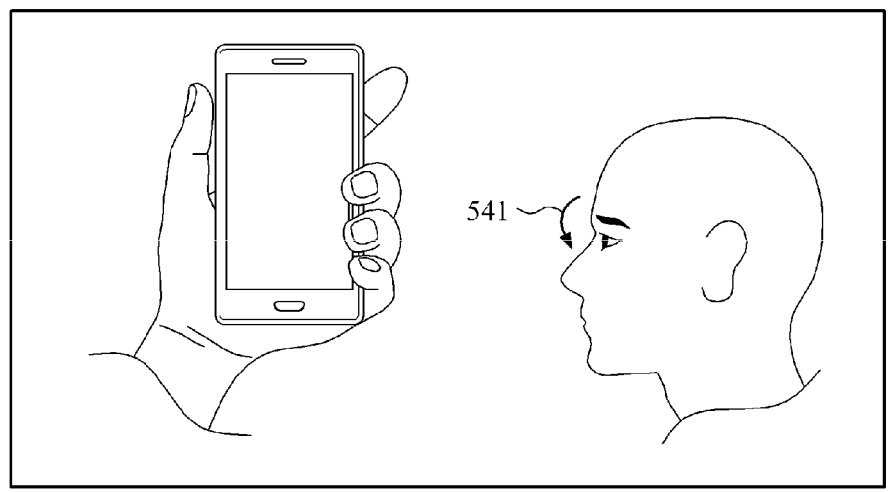
Figure 5C:
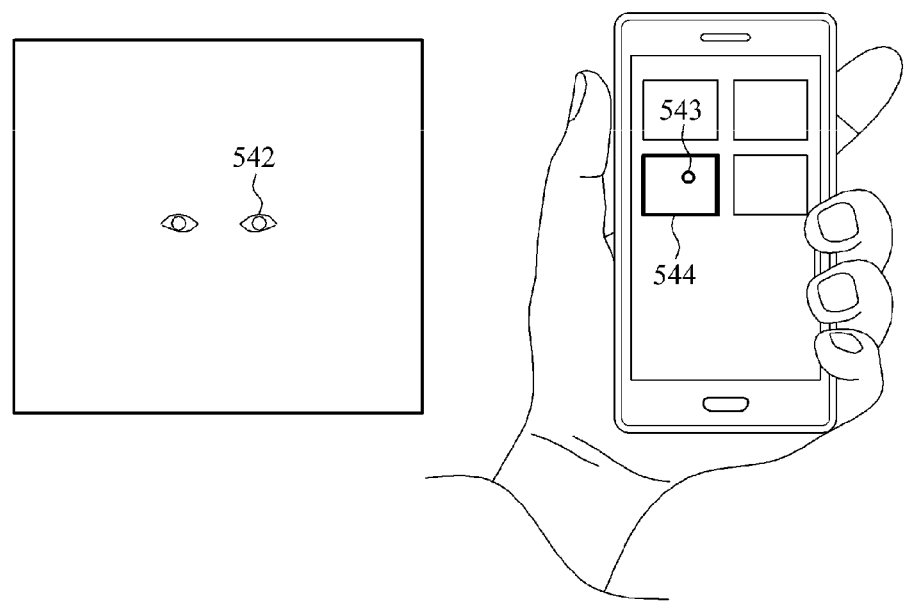

Referring to FIG. 5C, an input 541 of an eye blinking may be processed. For example, a user may blink an eye in a state of gazing at a vision sensor. When the vision sensor is an event-based sensor, the vision sensor may output events 542 corresponding to the eye of the user. Based on a number or a distribution of the events 542, the user input processing apparatus may determine that a change amount of an input image is small (e.g., less than a threshold value). The user input processing apparatus may select an object 544 of a location 543 at which the cursor is currently present, from among a plurality of objects included in a gallery, and highlight the object 544 to indicate that the object 544 is selected. In this example, a scheme of highlighting the object 544 may be implemented in various patterns. For example, the user input processing apparatus may highlight the object 544 by bolding a periphery of the object 544.

Figure 5D:
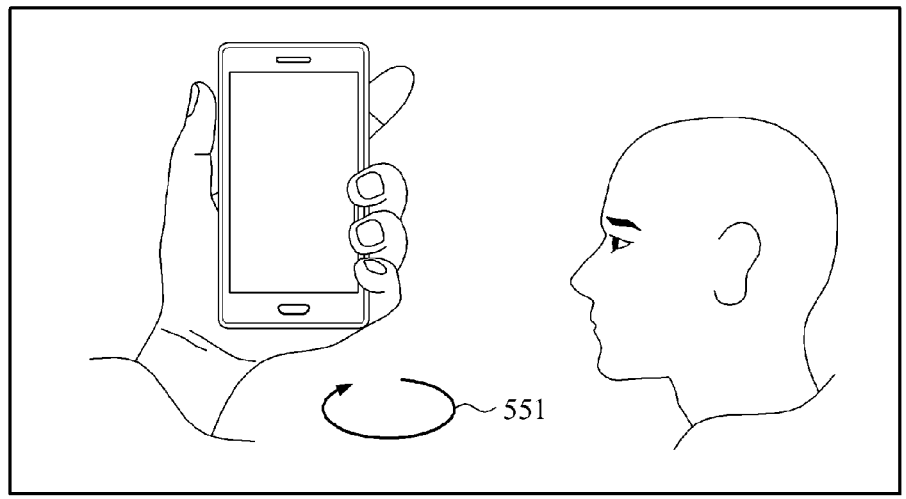
Figure 5D:
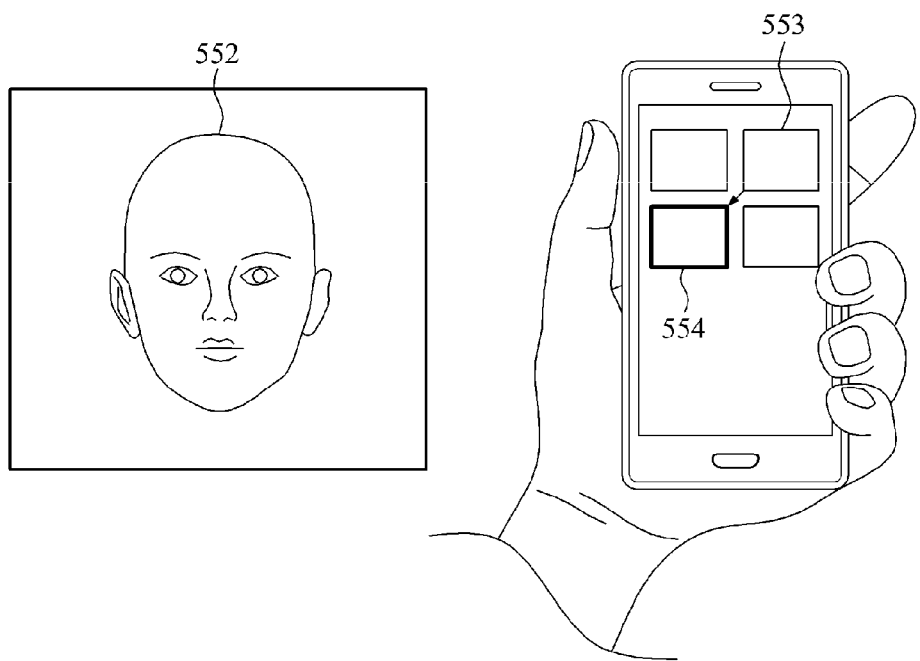

According to an exemplary embodiment, the user input processing apparatus may change an object to be highlighted, and process inputs of selecting the object to be highlighted. Referring to FIG. 5D, an input 551 of moving the user input processing apparatus may be processed. For example, a user may move the user input processing apparatus include a vision sensor in a state of gazing at the vision sensor. When the vision sensor is an event-based sensor, the vision sensor may output events 552 corresponding to a facial outline of the user. Based on a number or a distribution of the events 552, the user input processing apparatus may determine that a change amount of an input image is large (e.g., greater than a threshold value). The user input processing apparatus may compute at least one velocity component corresponding to a change in the input image. When the computed velocity component indicates a lower left direction, the user input processing apparatus may change the object to be highlighted from a first object 553 to a second object 554.

Figure 5E:
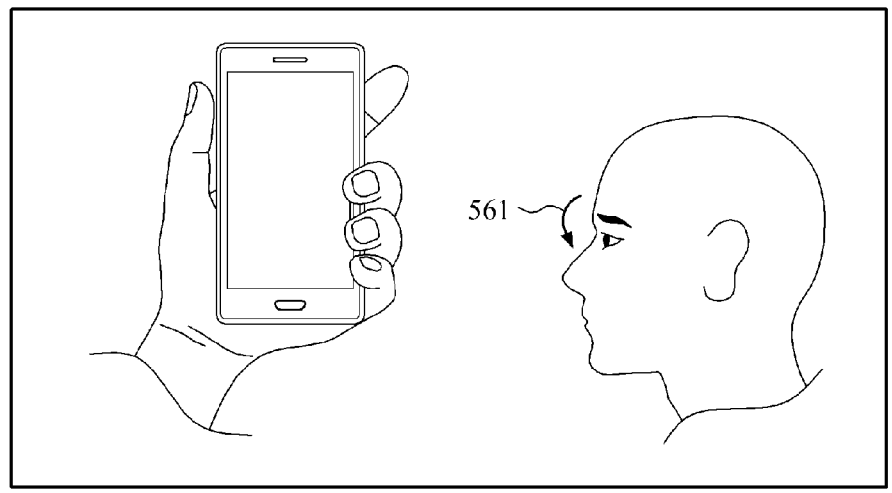
Figure 5E:
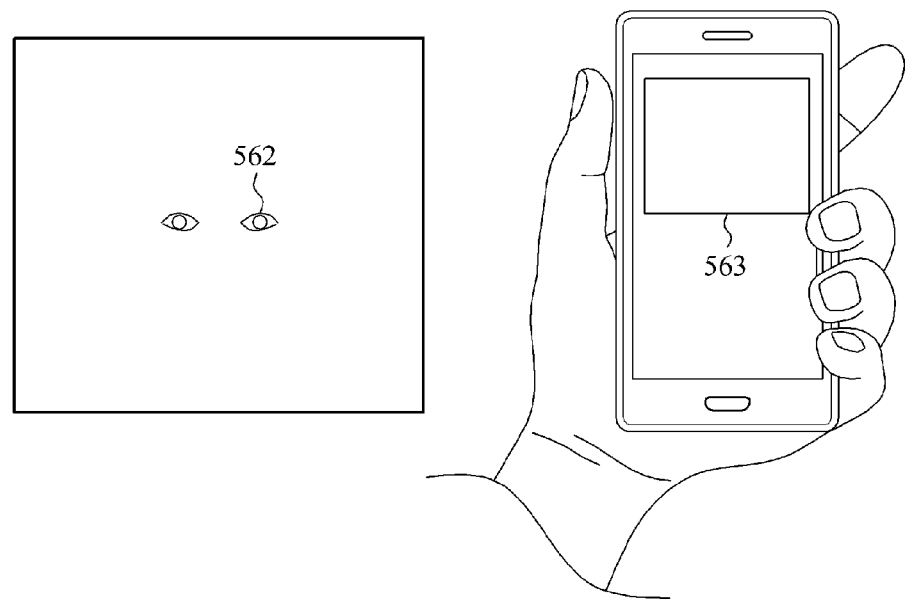

Referring to FIG. 5E, an input 561 of an eye blinking may be processed. For example, a user may blink an eye in a state of gazing at a vision sensor. When the vision sensor is an event-based sensor, the vision sensor may output events 562 corresponding to the eye of the user. Based on a number or a distribution of the events 562, the user input processing apparatus may determine that a change amount of an input image is small. On a screen, the user input processing apparatus may remarkably display an object 563 currently being in a highlighted state among a plurality of objects included in a gallery. In this example, the object 563 may correspond to the second object 554 of FIG. 5D.

Here, the plurality of objects included in the gallery may be multimedia contents such as photographs and moving images, for example. Descriptions provided with reference to FIGS. 5B through 5E may be directly applied to a user input process for one of icons and/or a plurality of selectable menus.

Figure 6:
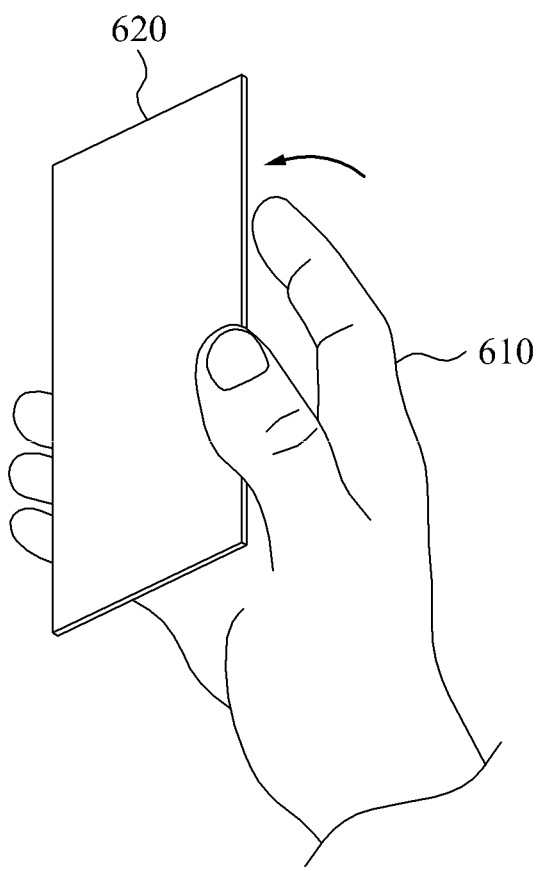
FIGS. 6 and 7 are diagrams which illustrate examples of an additional input according to an exemplary embodiment.
Figure 7:
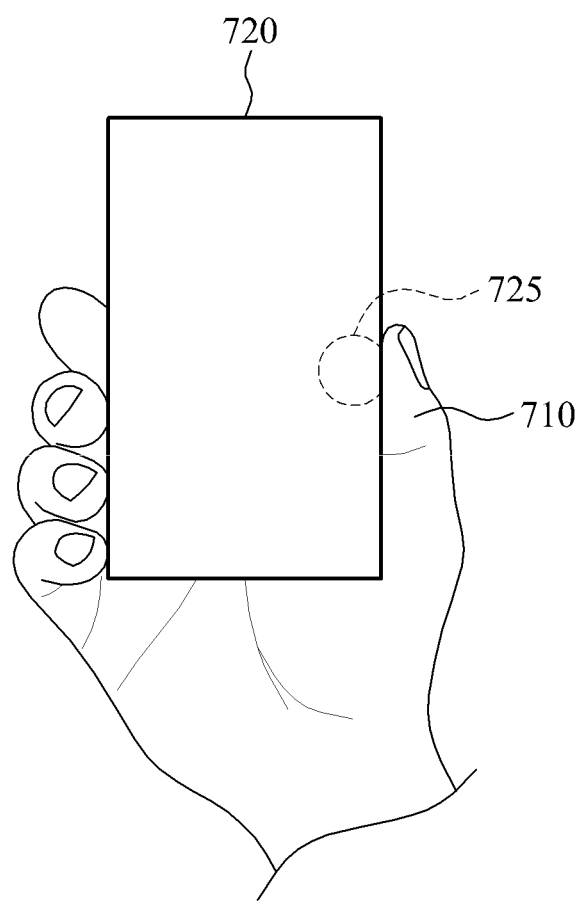

FIGS. 6 and 7 are diagrams which illustrate examples of an additional input according to an exemplary embodiment. Referring to FIG. 6, a user input processing apparatus 620 according to an exemplary embodiment may receive an additional input. For example, the user input processing apparatus 620 may sense a vibration occurring in response to an external stimulation such as a finger of a user. The user input processing apparatus 620 may determine the external stimulation 610 to be a first type input, and process a user input based on the first type input. The user input processing apparatus 620 may use, for example, a vibration sensor, a gyro sensor, and the like. According to another exemplary embodiment, the user input processing apparatus 620 may determine one or more characteristics of the external stimulation 610 (e.g., a magnitude of the external stimulation 610) and determine the type of input as the first type input, a second type input, or a third type input according to the determined one or more characteristics (e.g., with reference to one or more threshold values).

Referring to FIG. 7, a user input processing apparatus 720 according to an exemplary embodiment may provide an interface for an additional input. For example, the user input processing apparatus 720 may predict a location 710 of a finger of a user, and provide a button interface around the location 710. The user input processing apparatus 720 may determine an input received through the button interface 725 to be a first type input, and process a user input based on the first type input.

Figure 8:
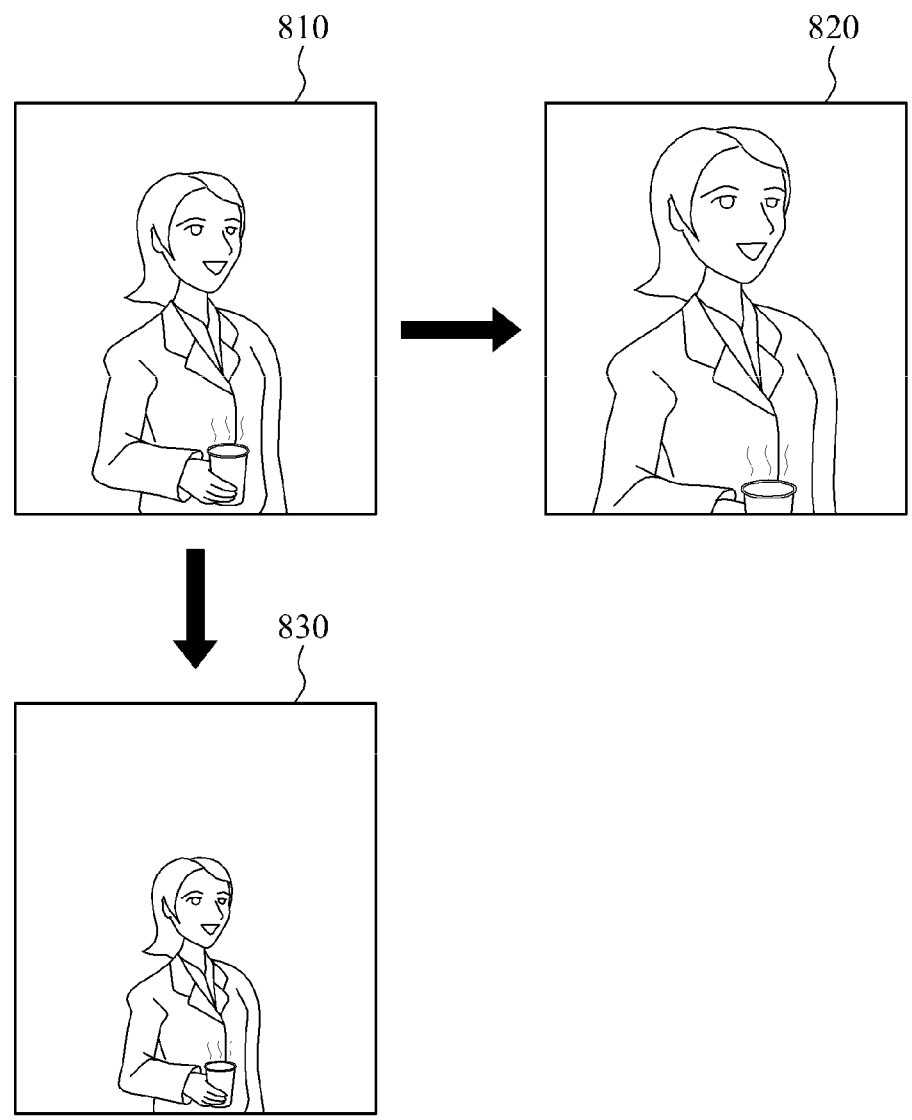
FIG. 8 is a diagram which illustrates an input image changed based on a Z-axis directional velocity component according to an exemplary embodiment.

FIG. 8 is a diagram which illustrates an input image changed based on a Z-axis directional velocity component according to an exemplary embodiment. Referring to FIG. 8, a user input processing apparatus may distinguish a case of receiving a first input image 820 obtained by enlarging an image 810 provided as a reference, and a case of receiving a second input image 830 obtained by reducing the image 810.

In an example, as shown in the first input image 820, the user may move the user input processing apparatus in a direction close to the user. In this example, a vision sensor included in the user input processing apparatus may be correspondingly moved, and a light incident on to the vision sensor or an overall image captured by the vision sensor may be changed. The user input processing apparatus may determine a change amount of an input image is large (e.g., greater than a threshold value), based on the first input image 820.

When the change amount of the input image is determined to be large, the user input processing apparatus may compute a velocity corresponding to a change in the input image. In this example, the velocity corresponding to the change in the input image may include a Z-axial velocity component as a main velocity component. Based on a magnitude of the Z-axial velocity component, the user input processing apparatus may determine the user input to be a second type input or a third type input.

The user input processing apparatus may process the user input based on at least one of a type of the user input, a direction of the Z-axial velocity component, a current location of a pointer, an application currently being executed, and the like. For example, when the user input is determined to be the second type input, the user input processing apparatus may perform an operation of enlarging a screen based on the current location of the pointer as a center.

In another example, as shown in the second input image 830, the user may move the user input processing apparatus in a direction far from the user. In this example, the vision sensor included in the user input processing apparatus may be correspondingly moved, and the light incident on to the vision sensor or the entire image captured by the vision sensor may be changed. Based on the second input image 830, the user input processing apparatus may determine the change amount of the input image to be large (e.g., greater than a threshold value).

When the change amount of the input image is determined to be large, the user input processing apparatus may compute a velocity corresponding to the change in the input image. In this example, the velocity corresponding to the change in the input image may include the Z-axial velocity component as the main velocity component. Based on a magnitude of the Z-axial velocity component, the user input processing apparatus may determine the user input to be the second type input or the third type input.

The user input processing apparatus may process the user input based on at least one of a type of the user input, a direction of the Z-axial velocity component, a current location of a pointer, an application currently being executed, and the like. For example, when the user input is determined to be the second type input, the user input processing apparatus may perform an operation of reducing a screen based on the current location of the pointer as a center.

Figure 9:
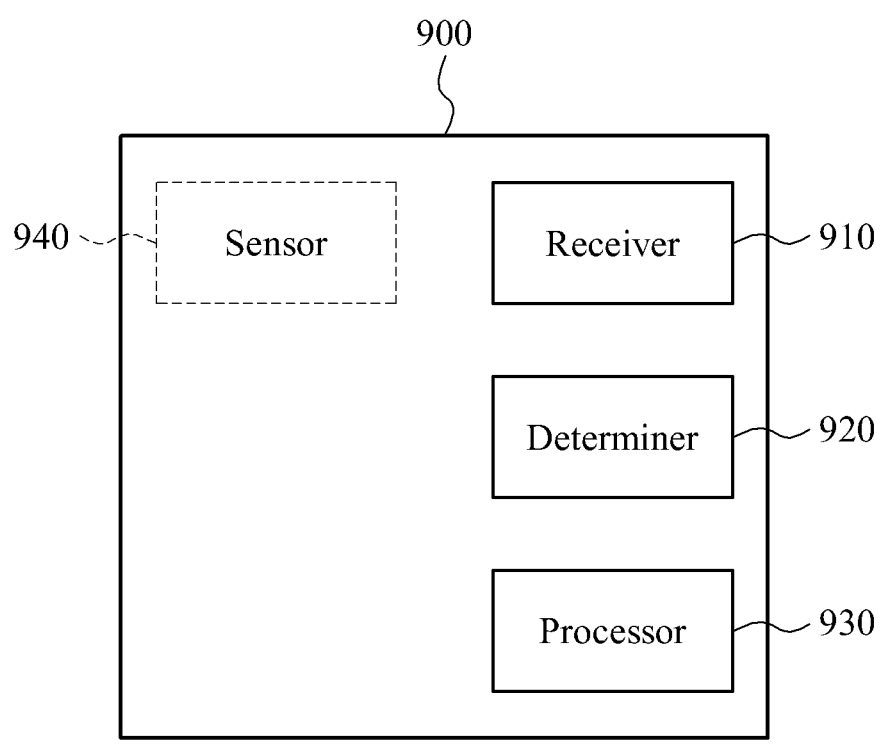
FIG. 9 is a block diagram which illustrates a user input processing apparatus according to an exemplary embodiment.

FIG. 9 is a block diagram which illustrates a user input processing apparatus 900 according to an exemplary embodiment. Referring to FIG. 9, the user input processing apparatus 900 according to an exemplary embodiment may include a receiver 910, a determiner 920, and a processor 930. The receiver 910 may receive (e.g., obtain) one or more events occurring in response to a change in an incident light (e.g., light incident on an image sensor). The determiner 920 may determine a type of a user input based on a number of the one or more events. The processor 930 may process the user input based on the determined type.

The user input processing apparatus 900 may also include a sensor 940. By way of example, the sensor 940 may sense a change in a brightness of the incident light, and generate the one or more events in response to the sensing.

Descriptions provided with reference to FIGS. 1 through 4, 5A through 5E, and 6 through 8 may be directly applied to elements illustrated in FIG. 9 and thus, repeated descriptions will be omitted below for increased clarity and conciseness.

Figure 10:
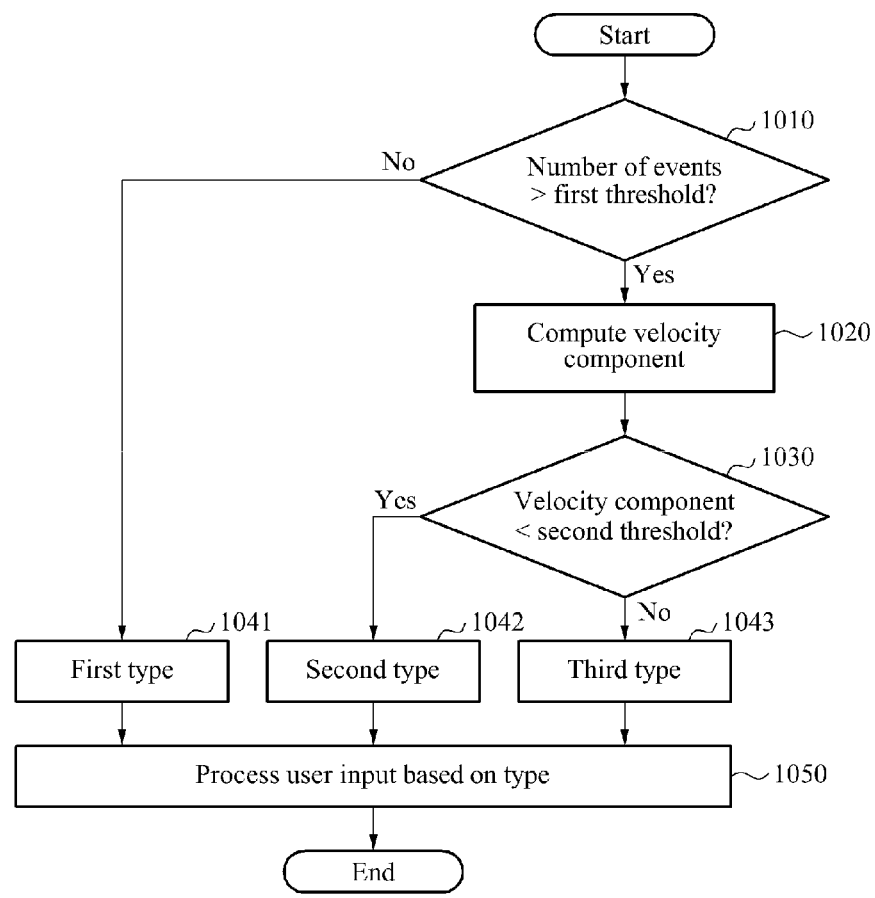
FIGS. 10 and 11 are flowcharts which illustrate a user input processing method according to an exemplary embodiment.
Figure 11:
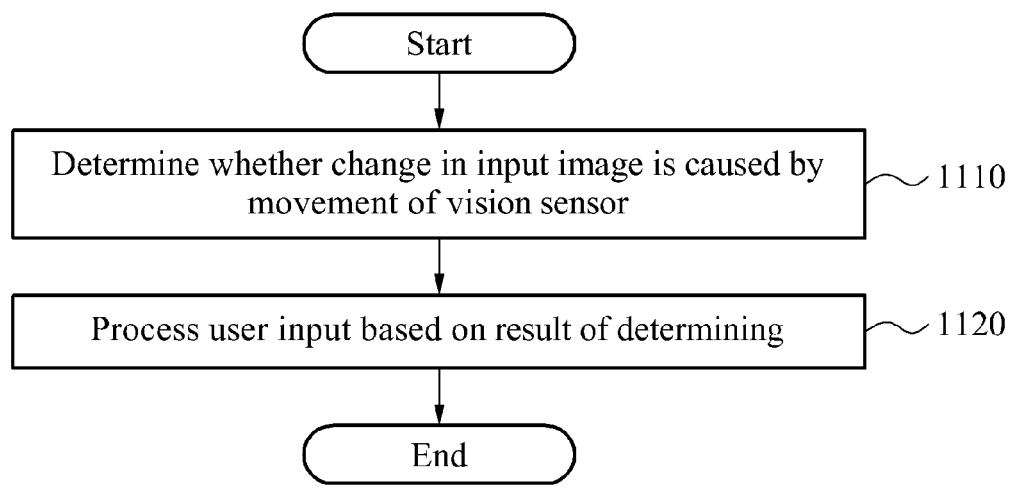

FIGS. 10 and 11 are flowcharts which illustrate a user input processing method according to one or more exemplary embodiments. Referring to FIG. 10, in operation 1010, whether a number of events is greater than a predetermined first threshold may be determined. When the number of events is less than or equal to the predetermined first threshold, a user input may be determined to be a first type in operation 1041.

When the number of events is greater than the predetermined first threshold, a velocity component may be computed in operation 1020. The velocity component may include at least one of a planar velocity component, an angular velocity component, and a Z-axial velocity component. In operation 1030, whether the velocity component is less than a predetermined second threshold may be determined.

When the velocity component is less than the predetermined second threshold, the user input may be determined to be a second type in operation 1042. When the velocity component is greater than or equal to the predetermined second threshold, the user input may be determined to be a third type in operation 1043. In operation 1050, the user input may be processed based on the type of the user input.

Referring to FIG. 11, a user input processing method may include an operation 1110 of determining whether a change in an input image is caused by a movement of a vision sensor, and an operation 1120 of processing a user input based on a result of the determining.

In operation 1110, when a change amount of the input image is greater than a predetermined threshold, the change in the input image may be determined to be caused by the movement of the vision sensor. When the change in the input image is determined to be caused by the movement of the vision sensor, at least one velocity component corresponding to the change may be computed in operation 1120. In this case, the user input may be processed based on the velocity component in operation 1120.

When the change amount of the input image is less than the predetermined first threshold, the change in the input image may be determined to be caused by a movement of an object captured by the vision sensor. In this case, an operation corresponding to the object may be performed in operation 1120.

Descriptions provided with reference to FIGS. 1 through 4, 5A through 5E, and 6 through 8 may be directly applied to operations of FIGS. 10 and 11 and thus, repeated descriptions will be omitted below for increased clarity and conciseness.

While one or more of the above-described exemplary embodiments are made with reference to determining a change in an input image and a velocity component of an input image, it is understood that one or more other exemplary embodiments are not limited thereto. For example, according to another exemplary embodiment, the type of input may be determined based on only the change in the input image or based on only the velocity component, or may be based on one or more other characteristics of the input image or the gesture input. Furthermore, while or more of the above-described exemplary embodiments are made with reference to three types of inputs, it is understood that one or more other exemplary embodiments are not limited thereto. For example, according to another exemplary embodiment, the type of input may be determined from among less than three types of inputs or more than three types of inputs. In this case, the determination may be based on various numbers of predetermined threshold values.

The units and elements described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable gate array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Methods according to one or more of the above-described exemplary embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments have been shown and described, the present inventive concept is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A user input processing apparatus comprising:
    a receiver configured to obtain one or more events occurring in response to a change in an incident light, wherein a first event of the one or more events is generated when the change in the incident light is sensed for a first pixel of a plurality of pixels of an image sensor;
    a determiner configured to determine a type of a user input based on a number of the obtained one or more events; and
    a processor configured to process the user input based on the determined type.

2. The apparatus of claim 1, wherein the determiner is configured to determine at least one velocity component corresponding to the obtained one or more events, and to determine the type of the user input based on the at least one velocity component.

3. The apparatus of claim 2, wherein the at least one velocity component comprises a planar velocity component, an angular velocity component, and a Z-axial velocity component.

4. The apparatus of claim 1, wherein the determiner is configured to determine the type of the user input to be a first type if the number of the obtained one or more events is less than a first threshold.

5. The apparatus of claim 1, wherein the determiner is configured to, if the number of the obtained one or more events is greater than a first threshold, determine at least one velocity component corresponding to the obtained one or more events and determine the type of the user input based on a magnitude of the determined at least one velocity component.

6. The apparatus of claim 5, wherein:
    the determiner is configured to determine the type of the user input to be a second type if the magnitude of the determined at least one velocity component is less than a second threshold; and
    the determiner is configured to determine the type of the user input to be a third type if the magnitude of the determined at least one velocity component being greater than the second threshold.

7. The apparatus of claim 1, wherein the determiner is configured to determine the type of the user input to be one of at least three types, based on the number of the obtained one or more events and a magnitude of at least one velocity component corresponding to the obtained one or more events.

8. The apparatus of claim 7, wherein:
    the at least three types comprises a first type in which the number of the obtained one or more events is less than a first threshold;
    a second type in which the number of the obtained one or more events is greater than the first threshold and each magnitude of the at least one velocity component corresponding to the obtained one or more events is less than a second threshold; and
    a third type in which the number of the obtained one or more events is greater than the first threshold and the magnitude of the at least one velocity component is greater than the second threshold.

9. The apparatus of claim 1, wherein the processor is configured to perform an operation corresponding to the determined type based on at least one of the determined type, a pattern of the user input, a current location of a pointer, and an application currently being executed.

10. The apparatus of claim 1, wherein the processor does not process a new user input during a time interval after the user input if the type of the user input is determined to be a third type in which the number of the obtained one or more events is greater than a first threshold and a magnitude of at least one velocity component corresponding to the obtained one or more events is greater than a second threshold.

11. The apparatus of claim 1, further comprising:
a sensor configured to sense a change in a brightness of the incident light for the first pixel of the image sensor and, in response to the sensing, to generate the first event.

12. The apparatus of claim 1, wherein the change in the incident light is caused by at least one of an eye blinking, a pupil movement, a nose tip movement, a tongue movement, a lip movement, and a head movement of a user.

13. The apparatus of claim 1, wherein the determiner is configured to detect one or more events corresponding to an object from among the obtained one or more events, and determine the type based on at least one of a number of the detected one or more events and at least one velocity component corresponding to the detected one or more events.

14. The apparatus of claim 1, further comprising:
an input unit configured to receive an additional input,
wherein the processor is configured to perform an operation corresponding to the received additional input.

15. A user input processing method comprising:
generating a first event when change in an incident light is sensed for a first pixel of a plurality of pixels of a sensor;
obtaining one or more events occurring in response to the change in the incident light;
determining a type of a user input based on a number of the obtained one or more events; and
processing the user input based on a result of the determined type.

16. The method of claim 15, wherein the first event includes an instructor of the first pixel and timestamp at which the change is sensed.

17. The method of claim 15, wherein the determining comprises determining the type of the user input to be a first type if the number of the obtained one or more events is less than a first threshold.

18. The method of claim 15, wherein the determining comprises determining at least one velocity component corresponding to the obtained one or more events and determining the type of the user input based on the at least one velocity component.

19. The method of claim 15, wherein the processing comprises, performing an operation corresponding to the type of the user input.

20. A non-transitory computer-readable recording medium which stores a program to implement the method of claim 15.

* * * * *